No. 609,431. Patented Aug. 23, 1898.
D. W. HARPER.
DIPPER.
(Application filed Nov. 13, 1897.)
(No Model.)
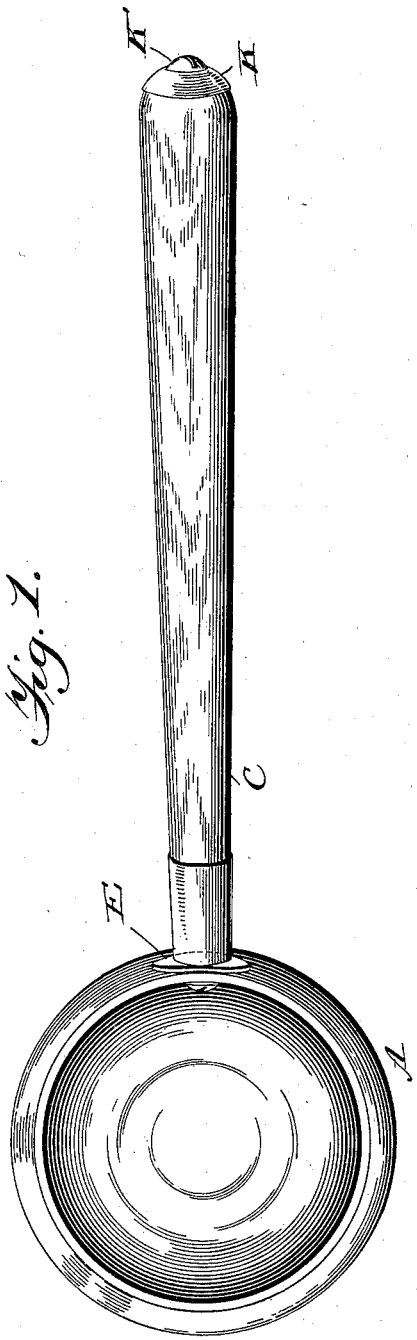
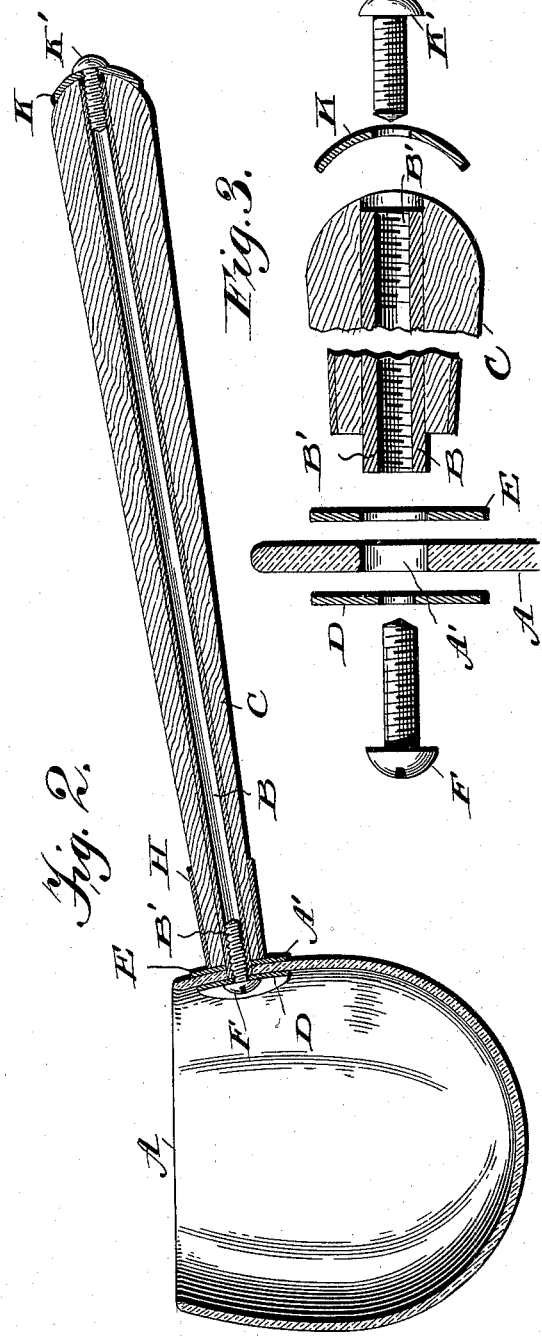
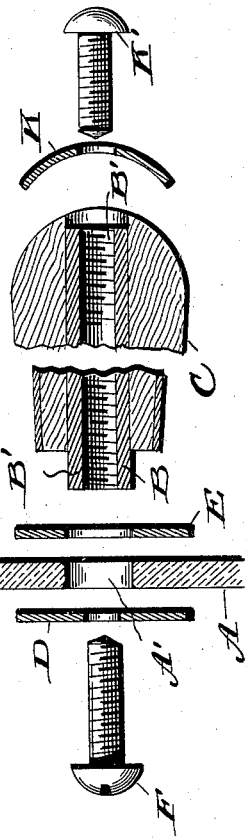
Witnesses:
L. C. Hills.
A. L. Hough.
Inventor:
Daniel W. Harper,
By Franklin H. Hough
Atty.
THE NORRIS PETERS CO., PHOTO-LITHO., WASHINGTON, D. C.

UNITED STATES PATENT OFFICE.

DANIEL W. HARPER, OF MEMPHIS, TENNESSEE, ASSIGNOR OF ONE-HALF TO ROBERT L. MATTHEWS, OF SAME PLACE.

DIPPER.

SPECIFICATION forming part of Letters Patent No. 609,431, dated August 23, 1898.

Application filed November 13, 1897. Serial No. 658,385. (No model.)

*To all whom it may concern:*

Be it known that I, DANIEL W. HARPER, a citizen of the United States, residing at Memphis, in the county of Shelby and State of Tennessee, have invented certain new and useful Improvements in Dippers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in dippers, and especially to a detachable bowl and handle, it being my purpose to make the bowls of glass, earthenware, or other suitable material, which when the bowl of the dipper becomes broken or otherwise injured the same may be replaced, using the old handle, which is adjustably fastened to the bowl in a suitable manner.

More specifically the invention resides in the provision of a bowl of the character described which is apertured to receive the end of a handle which has a centrally and longitudinally disposed tube internally threaded for a short distance within its ends and into which may be screwed or otherwise fastened retaining-screws, which are employed to hold the various parts of the dipper together.

To these ends and to such others as the invention may pertain, the same consists, further, in the novel construction, combination, and adaptation of parts, as will be hereinafter more fully described, and then specifically defined in the appended claim.

The invention is clearly illustrated in the accompanying drawings, which, with the letters of reference marked thereon, form a part of this specification.

In the drawings, Figure 1 is a top plan view looking into the bowl of the dipper. Fig. 2 is a central vertical longitudinal sectional view through the bowl, the pipe, and the handle. Fig. 3 is a vertical sectional view of parts disassembled.

Reference now being had to the details of the drawings by letter, A designates the bowl of the dipper, which bowl may be made of glass, earthenware, or other suitable material, and is apertured, as at A', for the reception of the tube B, which is carried in the handle C. This tube B is internally screw-threaded near its ends, as seen at B'. At the bowl end of the handle the said tube extends slightly beyond the handle and is designed to snugly fit in the aperture A' in the bowl.

In order to hold the handle which carries the tube securely to the bowl, the disks D and E are employed, of such a shape as will correspond with the shape of the bowl of the dipper, and the former disk D is centrally apertured, the said aperture being of such a size as to allow the screw F to pass through same, which screw is to be screwed into the end of the said tube B', so as to hold the inner end of the handle tightly against the bowl, as illustrated in the drawings. The disk E has also a central aperture slightly larger in diameter than that in the disk D, so that the disk E will fit over the outer circumference of the tube B' and clamp against the outer surface of the bowl when the handle is adjusted to the latter. A suitable ferrule H is carried on the inner end of the handle and bears against the disk clamped to the outer surface of the bowl. At the outer end of the handle is disposed the disk K, which fits over the end of the handle and is held thereto by means of the screw K', which latter screws into the threaded end of the tube B', as plainly seen in Fig. 2 of the drawings. It will be noted that a small space intervenes between the outer end of the tube B' and the outer end of the handle C, so as to allow for the tightening of the parts as the screw is inserted in the end of the tube and the parts brought together.

From the foregoing it will be seen that a dipper constructed in accordance with my invention will allow of the ready replacement of the bowl when broken without necessitating the employment of a new handle.

Having thus described my invention, what I claim to be new, and desire to secure by Letters Patent, is—

In a dipper, the combination with the bowl made of glass or other suitable material, the handle the threaded tube mounted therein, the disks D and E, the screws F and K', and the disk K, all arranged substantially as shown and described.

In testimony whereof I affix my signature in presence of two witnesses.

DANIEL W. HARPER.

Witnesses:
 FRANKLIN H. HOUGH,
 A. L. HOUGH.